United States Patent
Thall et al.

(10) Patent No.: US 12,346,632 B2
(45) Date of Patent: Jul. 1, 2025

(54) CALIBRATION GAIN FOR REAL WORLD SOUNDS

(71) Applicant: Apple Inc., Cupertino, CA (US)

(72) Inventors: David Thall, Santa Monica, CA (US); Edward L. Stein, Soquel, CA (US); Matthew S. Connolly, San Jose, CA (US); Bharathidasan Venkatesan, Fremont, CA (US); Pedro M. De Sa Carvahlo Corvo, West Hollywood, CA (US)

(73) Assignee: Apple Inc., Cupertino, CA (US)

( * ) Notice: Subject to any disclaimer, the term of this patent is extended or adjusted under 35 U.S.C. 154(b) by 260 days.

(21) Appl. No.: 18/072,031

(22) Filed: Nov. 30, 2022

(65) Prior Publication Data
US 2023/0176811 A1 Jun. 8, 2023

Related U.S. Application Data

(60) Provisional application No. 63/285,263, filed on Dec. 2, 2021.

(51) Int. Cl.
*G06F 3/16* (2006.01)
*H04R 3/04* (2006.01)

(52) U.S. Cl.
CPC ............ *G06F 3/165* (2013.01); *H04R 3/04* (2013.01); *H04R 2430/01* (2013.01)

(58) Field of Classification Search
CPC ........ G06F 3/165; H04R 3/04; H04R 2430/01
See application file for complete search history.

(56) References Cited

U.S. PATENT DOCUMENTS

| 10,943,395 B1* | 3/2021 | Green | G06F 3/0346 |
| 11,086,392 B1* | 8/2021 | Sztuk | G06F 3/1423 |
| 2020/0288258 A1* | 9/2020 | Connolly | G10L 19/008 |
| 2022/0007065 A1* | 1/2022 | Facey | H04N 21/4348 |

OTHER PUBLICATIONS

Zuther, Martin, "K-Meter, Free implementation of a K-System meter according to Bob Katz' specifications," Creative Commons Attribution-ShareAlike 4.0 International License, Apr. 17, 2020, 66 pages.
"Unity—Manual: Audio Mixer," Version 2020.3, retrieved from the Internet <https://docs.unity3d.com/Manual/AudioMixer.html> on Nov. 1, 2021, 4 pages.

(Continued)

*Primary Examiner* — Fan S Tsang
*Assistant Examiner* — David Siegel
(74) *Attorney, Agent, or Firm* — Aikin & Gallant, LLP (57) ABSTRACT

An application programming interface, API, and its implementing functions provide software code that can be incorporated into a simulated reality application and that determine a total calibration gain that is to be applied during run time of the application, to the audio signal of a particular digital audio asset that has been selected by the author of the simulated reality application. The total calibration gain includes at least a loudness correction gain that is determined based on a user-specified sound level parameter indicated through the API by the author. Other aspects are also described and claimed.

26 Claims, 3 Drawing Sheets

(56) References Cited

OTHER PUBLICATIONS

"Unity—Manual: Audio Overview," Version 2020.3, retrieved from the Internet <https://docs.unity3d.com/Manual/AudioOverview.html> on Nov. 1, 2021, 3 pages.

"Unity—Manual: Audio," Version 2020.3, retrieved from the Internet <https://docs/unity3d.com/Manual/class-AudioManager.html> on Nov. 1, 2021, 4 pages.

"Unity—Manual: Audio Listener," Version 2020.3, retrieved from the Internet <https://docs.unity3d.com/Manual/class-AudioListener.html> on Nov. 1, 2021, 3 pages.

"Unity—Manual: Audio Spatializer SDK," Version 2020.3, retrieved from the Internet <https://docs.unity3d.com/Manual/AudioSpatializerSDK.html#SpatializerMetaData> on Nov. 1, 2021, 9 pages.

"Sound Attenuation," Unreal Engine Documentation, retrieved from the Internet <https://docs.unrealengine.com/4.27/en-US/WorkingWithAudio/DistanceModelAttenuation/> on Nov. 1, 2021, 57 pages.

"Recommendation ITU-R BS.2076-2; Audio definition model," International Telecommunication Union, Oct. 2019, 115 pages.

Unpublished Provisional U.S. Appl. No. 63/348,739, filed Jun. 3, 2022, 40 pages.

\* cited by examiner

CALIBRATION GAIN FOR REAL WORLD SOUNDS

This nonprovisional patent application claims the benefit of the earlier filing date of U.S. provisional application No. 63/285,263 filed Dec. 2, 2021.

One aspect of the disclosure here relates to computer software techniques for setting the real playback loudness of virtual objects in a simulated reality application program. Other aspects are also described.

BACKGROUND

Authors of simulated reality application programs such as virtual reality and augmented reality apps have not been given much programmatic control, within the application development software that they use to author their apps, over how loud a particular virtual object they have defined in the application will sound during real world playback. The application could be executed by various types of audio playback hardware devices. But different hardware devices (e.g., laptop computer, tablet computer, headphones) have different playback sensitivity, due to differences in their audio amplifiers, speaker drivers (also referred to as transducers, e.g., a loudspeaker driver, a micro-speaker driver, a headphone speaker driver), and acoustic design. As such, the same digital audio asset will be experienced with different playback loudness across different hardware devices. Another issue is that an end user of the application can manually adjust a volume dial (that sets a variable, end user selectable or "manual" volume setting on their hardware device), which can change the sound level and thereby making it different than the desired sound level that the author intended.

SUMMARY

In one aspect, a software development kit, SDK, provides an application programming interface, API, and its implementing functions that provide software code that can be incorporated into a simulated reality application. The API configures a total calibration gain, which is to be applied during run time of the simulated reality application to the audio signal of a particular digital audio asset that has been selected by the author of the simulated reality application. The total calibration gain includes at least a loudness correction gain that is configured by the API based on a user-specified sound level that is indicated by a user (the author) through an input parameter of the API. The desired sound level may be the level at which the author desires an end user (listener) of the simulated reality to hear the audio asset during run time of the app, at some virtual reference distance from a virtual object to which the audio asset has been assigned. The code for determining the calibration gain is incorporated by the SDK into the simulated reality application (that is being composed.) The calibration gain is then automatically determined by the code and applied to every playback instance of the audio asset, during run time (execution of the app.) In this manner, the playback of the audio asset is gain-corrected to reflect the expected real world sound level desired by the author of the app.

In another aspect, recognizing that an audio asset can be associated with a virtual object and that the distance between the virtual object and the virtual listening position changes during run time of the app, the API and its implementing functions provide software code (that is to be incorporated into the simulated reality application by the SDK) which determines a relative distance gain. The relative distance gain is a function of the virtual distance during run time (execution of the app), which is the distance between the virtual object and the virtual listening position. The relative distance gain may be automatically applied to every playback instance of the audio asset, during run time. The function that implements the relative distance gain is defined or configured by the API, based on a set of input parameters of the API.

The determination of the calibration gain and the relative distance gain are transparent to the author, making the task of composing the simulated reality application easier while still ensuring a real world playback loudness experience that is also faithful to the desires of the author.

Another advantage of the solutions described below is that they enable the author to realistically preview in sound, during simulation of the simulated reality application, a 3D or spatial audio mix for their composed virtual reality scene.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

An author of a simulated reality computer application program (e.g., an augmented reality application, a virtual reality application) that defines a simulated reality scene may want to control the real loudness of the sounds that are heard by an end user or listener, at a virtual listening position, during playback of the scene. For example, a small bee may not be loud but it is audible when close to the listening position and then quickly fades to quiet as it flies away. As another example, a distant sound like a waterfall may be moderately loud but will not change much despite the listening position changing (because it is far away.) The following are several techniques for configuring a computer system, by for example configuring a processor of the system according to instructions stored in a computer readable medium such as memory, to help compose the simulated reality app, and in particular to enable the author to more easily control the playback loudness of the sound sources the author adds to the simulated reality application (as the playback is experienced by the end user when the application is being executed with a given type of hardware device.)

A computer being used by the author is configured by application development software, for example as part of a software development kit, SDK, that is to be executed by a processor of the computer. The application development software includes an application programming interface, API, that defines how the simulated reality application that is being authored can access certain functions within a library (that may also be part of the SDK.) The functions may be configured by a user, for example the author of the simulated reality app, and then incorporated into (e.g., compiled into) the simulated reality application by the SDK.

In one aspect, the API and its implementing functions provide software code that can be incorporated into the simulated reality application and that determine a total calibration gain that is to be applied, during run time of the app, to the audio signal of a particular digital audio asset that has been selected by the author of the simulated reality app. The total calibration gain includes at least a contribution from a loudness correction gain. The loudness correction gain may be viewed as correcting for the sliding scale between sound pressure levels achieved by different playback hardware devices for a given digital audio signal level. The loudness correction gain is determined based on a user-specified or desired sound level indicated through the API by the author. The desired sound level may be the level at which the author desires an end user (listener) of the simulated reality application to hear the audio asset during run time of the app, at some reference virtual distance from a virtual object to which the audio asset has been assigned. The code for determining the total calibration gain is incorporated by the SDK into the simulated reality application (that is being composed.) The total calibration gain is then automatically determined by the code and applied to every playback instance of the audio asset during run time (execution of the app.) In this manner, the playback of the audio asset is gain-corrected to reflect the expected real world sound level indicated by the author of the app.

In another aspect, recognizing that the audio asset is associated with a virtual object and that the distance between the virtual object and the virtual listening position changes during run time of the app, the API and its implementing functions provide software code (that is to be incorporated into the simulated reality application by the SDK) which determines a relative distance gain. The relative distance gain is a function of the real-time changing (during run time or execution of the app) distance, between the virtual object and the virtual listening position. The relative distance gain may also be automatically applied to every playback instance of the audio asset during run time. The function that implements the relative distance gain is defined or configured based on input parameters of the API, that make it easier to use by the author while ensuring realistic and artifact-free fading of the asset's sound particularly as the virtual object gets farther away from the virtual listening position.

The determination of the calibration gain and the relative distance gain are transparent to the author, making the task of composing the simulated reality application easier while still ensuring a real world playback loudness experience that is also faithful to the desires of the author.

Calibration Gain

Figure 1:
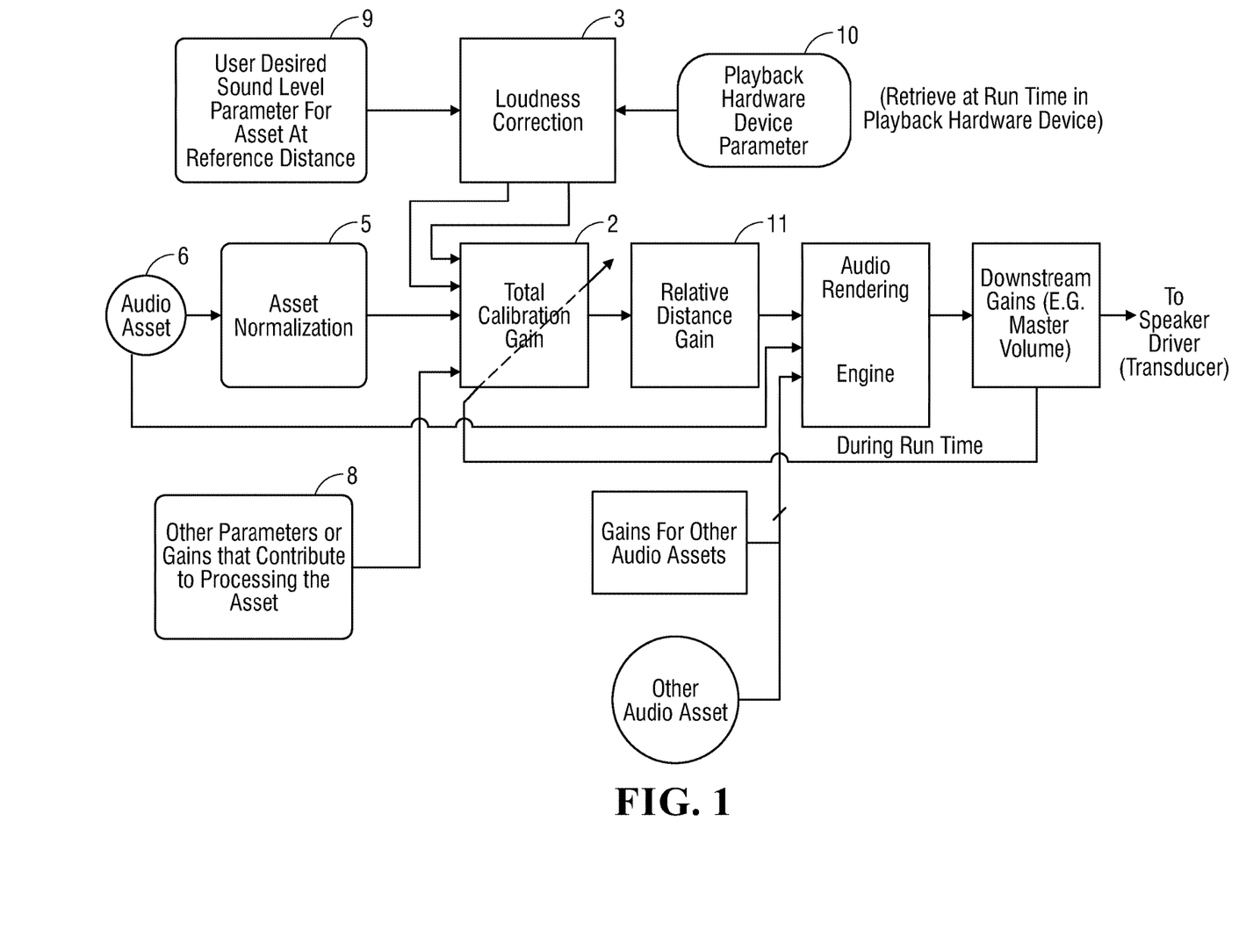
FIG. 1 is a block diagram of how a total calibration gain may be determined and used for adjusting the gain of an audio asset in a simulated reality application.

One aspect of the disclosure here that gives the author (of the simulated reality app) control of the loudness of a virtual object's real world sound is referred to as total calibration gain 2. FIG. 1 is a block diagram showing how the total calibration gain may be determined for a particular audio asset 6, and then applied within the simulated reality application to the audio asset 6 by an audio rendering engine for playback. Some of the parameters and functions shown may be configured based on user/author selections made while authoring the app, and then incorporated into the simulated reality app. Other parameters and functions may be computed or updated during run-time or during simulation of the app.

The total calibration gain 2 is a function which combines the contributions of several gains as shown in the figure into a "total" calibration gain. These contributions (also referred to here as gains) include a loudness correction gain produced by a loudness correction function (loudness correction 3) that is described below, and several other gains. Inputs to the total calibration gain function (total calibration gain 2) include an asset level of a particular audio asset 6. The asset level may be that of an already normalized audio asset (where the audio asset 6 may have been already normalized as needed or managed by the author for example or by a client program.) Alternatively, the asset level may be obtained from an asset normalization function (asset normalization 5) that is applied to re-define an unknown audio asset (in relation to a known term.)

If the audio asset 6 is maintained by an external software tool with an alternative normalization assumption, and that as a result the audio asset 6 should not be re-normalized by the asset normalization 5, then such a "do not re-normalize" indication may be provided as one of the other parameters or gains 8, within metadata of the audio asset 6. This parameter more generally indicates whether or how the audio asset 6 has been normalized or what the normalization assumptions are. In that case, the SDK or the code that it inserts into the simulated reality application determines the total calibration gain based on an indicated or implied level of the audio asset without applying asset normalization to the audio asset. This may be in response to such an indication, received through the API or in a tag or metadata associated with the audio asset. The indication is that the audio asset i) has already been normalized or ii) should not be re-normalized.

The asset normalization 5 may be performed by applying a static normalization gain, which is a single gain value, to the entire audio asset to bring it to an expected level on the whole (which also preserves dynamic range.) Alternatively, the asset normalization 5 may apply a dynamic normalization that may have a loudness model in which the gain applied to the audio asset 6 may change on a sample by sample basis (and is applied over the course of the entire audio asset.) In some cases, the dynamic normalization may be in real time, each time the audio asset 6 is being played back. The total calibration gain is then determined based on the normalized level of the audio asset that is produced by the dynamic normalization or the static normalization.

Contributions from other gains include grouping and other mixing gains (not shown) set by the author in the case where the particular audio asset is one of multiple audio assets that have been assigned to the same group.

Figure 2:
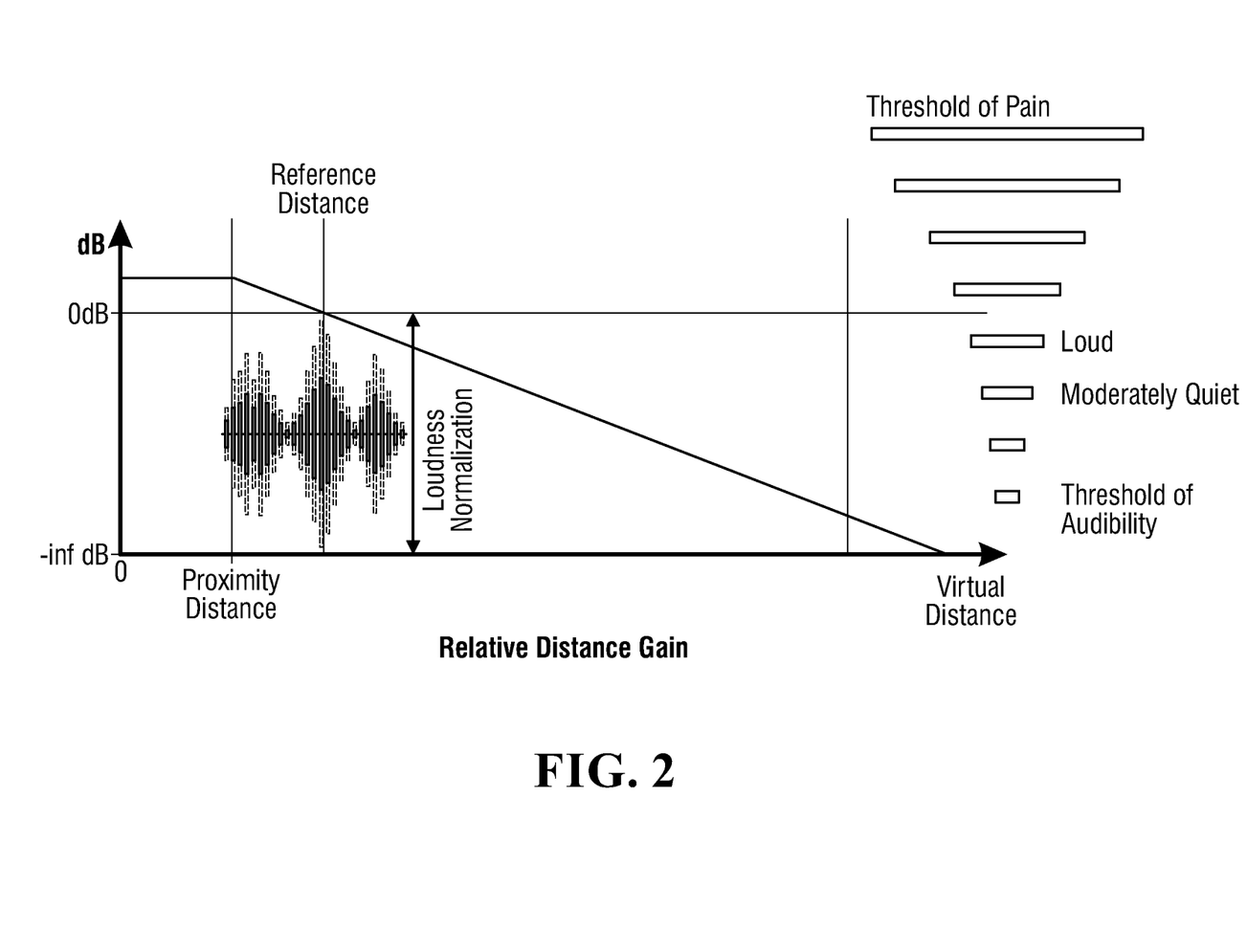
FIG. 2 illustrates an example of a relative distance gain model for further adjusting the gain of the audio asset in the simulated reality application.

In another aspect of the disclosure here, also illustrated in FIG. 2, in addition to or as an alternative to the user desired sound level parameter 9, input to the API may include other parameters or gains 8 that contribute to processing of the audio asset 6. The other parameters or gains 8 may include a parameter or a description of a desired behavior for the audio asset 6. For example, the author may want the level of the sound to be X at the reference distance that is set in block 9 and used in block 3 of FIG. 1, but does not want the total calibration gain 2 considered with the downstream gains (which are to the right of block 11 in FIG. 1) to result in a total level that is lower than Y. Ideally this may include a contribution from (or at least knowledge of) the relative distance gain, viewed in another sense as a minimum audibility parameter. As another example, the API comprises one or more other parameters or gains 8 that specify a loudness range in which, or a minimum acceptable loudness at which, sound of the audio asset 6 should be experienced, e.g., how an author would want to "contain" the sound of this particular audio asset, or keep the asset audible by specifying a minimum SPL. In one instance, the API may be auto populated by a wrapping layer or management layer that manages inputs to the API, for the user. The file of the audio asset 6 may be registered with various codec containers, and in that case the author may specify only the file, and then when the file is decoded or the asset becomes registered, the SDK automatically reads a tag (for the file) that contains the desired sound level and populates the API with the desired sound level extracted from the tag. The desired sound level may also be provided through the API but directly by the author, to augment or replace the one in the asset's tag.

The loudness correction 3 receives at least one parameter that can be set by the author, for example through the API provided by the application development software, on a per audio asset basis (and where the audio asset 6 may be identified as another parameter, e.g., as a pointer to the audio asset 6 in a library of audio assets.) As seen in the figure, the user desired sound level parameter 9 is specified, for the audio asset 6. It includes one or more values representing either directly or indirectly a sound level that should be heard by an end user (listener) when the virtual listening position is at some reference distance, e.g., 50 centimeters, 1 meter, from a virtual sound source to which audio of the audio asset 6 is assigned. The user desired sound level parameter 9 may be a sound pressure level (SPL), a perceived loudness level, or other sound level directly specified by the author of the simulated reality application (e.g., where the author is aware of the actual SPL they have specified.) The desired sound level may be given as a relative value (e.g., −6 dB from a nominal output level) or as an absolute value (e.g., 75 dbSPL defined at a virtual reference distance from a virtual sound source.) In one aspect, the one or more values for the user desired sound level parameter 9 are in a tag or metadata associated with the digital audio asset, e.g., in the same file as the audio asset.

As an example of the user desired sound level parameter 9 which indirectly represents a desired sound level, the tag or metadata may comprise or point to a codec, where the codec includes one or more values such as a desired sound level and the author may be actually unaware of those values.

One or more output (return) parameters of the API include a formula or process that defines the loudness correction 3. This formula or process may optionally incorporate the other gains shown in the figure, which are combined into the result produced by the total calibration gain 2. The formula or process is incorporated by the SDK as software code into the code of the simulated reality application that is being composed. The code determines the loudness correction 3 for the audio asset 6, based on the user desired sound level parameter 9 and based on a hardware playback device parameter 10. In one aspect, the hardware playback device parameter 10 represents a maximum or full scale sound level output that can be produced by a playback hardware device on which the simulated reality application is running. The playback hardware device parameter 10 is used here to correct for the sliding scale between a target sound pressure level, SPL, and a playback hardware device SPL for a chosen asset normalization (or reference digital audio level.) More generally, the hardware playback device parameter 10 may represent a known or predefined sound level that can be produced by a playback hardware device (on which the simulated reality application is running) for a chosen reference digital audio level. The code may determine a difference between i) one or more values of the user desired sound level parameter and ii) the playback hardware device sound level parameter, and the loudness correction gain 3 is selected to compensate for the difference, e.g., it is equal to the difference.

In one aspect, the code that is incorporated into the simulated reality application obtains the playback hardware device sound level parameter 10 during run time or during initialization time of the simulated reality application (and not during compilation of the simulated reality application.) For example, the code may query an operating system when the application is being launched by the operating system, to retrieve the type of playback hardware device on which the operating system is running. It may then perform a table look up using that identification to retrieve the parameter that has been previously determined for that type of hardware device. Alternatively, the code could retrieve the parameter directly from the operating system, for example where the hardware device is an unknown device that provides its own parameter. The parameter may include one or more gain values that depend on the playback acoustic sensitivity of the hardware device, e.g., the combination of its audio amplifier gain and its speaker sensitivity. Thus, a headphone, an extra-aural speaker on a head worn device, and a loudspeaker in a room will all have different playback device gains. In one instance, these different device gains may all be stored within a lookup table in the code that determines the calibration gain, or they may be individually provided to the querying code directly by the operating system running in a particular playback hardware device.

The total calibration gain includes a contribution by the loudness correction gain and is automatically applied in real time (during run time) by the simulated reality app, to every playback instance of the audio asset without having to perform any energy analysis upon the audio asset. Referring back to FIG. 1, the code that contains the formula or process of the total calibration gain may have incorporated the loudness correction gain along with contributions from other gains as shown in the figure. The total calibration gain may for example be computed in linear domain by multiplying all of the contributing gains in linear domain.

In one aspect, the API for the loudness correction gain is executed only once for each audio asset during development or authoring of the simulated reality app, and then the formula or process that computes the loudness correction gain is incorporated into the application where it remains fixed during run time of the app. In another aspect, the code that is incorporated into the application allows the formula or process for computing the loudness correction gain (for a given audio asset) to be a run time function that can be called several times during run time of the app, resulting in the loudness correction gain changing during run time.

In another aspect, the further code provided by the SDK, and that is incorporated into the code of the simulated reality app, determines that a real distance or real physical relationship between a speaker driver (acoustic transducer) of the playback hardware device and a listener's ear is different than a known or predefined distance or relationship, and based on that determination adjusts the total calibration gain for the digital audio asset, for example to compensate for that difference. This adjustment in the gain may be a boost, for instance when the real world distance is greater than the known or predefined distance, such as when a listener during loudspeaker playback is positioned farther away from their laptop or tablet computer than the known or predefined distance. Note that such real world attenuation (experienced by the listener due to them being located farther away from the speaker driver than expected by the author) depends on the given type of playback hardware device (and may not be a function of the desired sound level indicated by the author.)

In one instance, a lookup table may have been predetermined in the laboratory and then stored as part of the code that is incorporated into the simulated reality app. This lookup table may have gain adjustment values corresponding to various distance differences, for various types of playback hardware devices. These adjustment values may have been determined in the laboratory based on measured real world attenuations. Alternatively, the adjustment value could be estimated or determined during run time (by further code that is incorporated into the simulated reality app, for example, that obtains from the operating system a real time measurement of the real distance or real relationship between a speaker driver and a listener's ear. The further code may track this real distance or relationship during run time of the app, and may use this tracked parameter to make real time adjustments to the total calibration gain.

In another aspect of the total calibration gain, further code is inserted into the simulated reality application that contributes to the total calibration gain whether or not there is a volume dial in the given playback hardware device. The further code determines whether or not there is a volume dial by for example querying the operating system during run time, or by being given that information during compilation of the simulated reality app. If there is a volume dial, then the code may further query the operating system of the playback hardware device for the current manual volume setting for the volume dial (e.g., in a range 0-100%.) The manual volume setting may be a data structure in the operating system of the hardware device. The current manual volume setting may then be used to for example adjust the total calibration gain in certain instances (e.g., boost the total calibration gain for certain audio assets that may contain speech, but not others, in response to the listener having turned down the volume dial.) If the hardware device is determined to have no volume dial, then no additional contribution (adjustment) is made to the total calibration gain.

More generally, there may be one or more downstream gains (e.g., master volume, volume dial) which are applied to the audio mix produced by the audio rendering engine—thus "downstream" of the audio rendering engine, once the audio engine has combined other audio assets (and their respective gains) into an output audio mix that may be deemed to a speaker driver signal. Consider as an example the situation where the downstream gains in the playback hardware device are reduced. The code that implements the total calibration gain 2 may detect such a condition, and respond to it. For example, the code may decide to boost the total calibration gain 2 for a particular audio asset if it determines that the downstream gain has decreased more than a threshold amount, e.g., where the audio asset contains speech that would become inaudible if the downstream gain were lowered too much. Knowledge of the downstream gains may be useful in adjusting the total calibration gain 2 in other ways.

Still referring to FIG. 1, the following should be noted concerning loudness normalization that is performed by incorporating the normalized asset level 5 into the total calibration gain 2. In general, a goal for any normalization scheme may be that all normalized assets have the same "effective level" when considering the distance model and user-specified levels. In one aspect, that operation is performed by the application development software for example in response to the author specifying the normalized asset level 5. In another aspect, the audio asset 6 as retrieved from the asset library has already been loudness normalized to a known reference level, e.g., −6 dBFS, −12 dB LKFS, a K-meter level, or a loudness frequency weighted model. Also, if the audio asset 6 is a long sound, then it may be loudness normalized dynamically where in that case the normalized asset level 5 is a stream that can change on a per audio frame basis (and as such the total calibration gain 2 becomes a stream that can dynamically change for example on a per audio frame basis.) A long sound can also be normalized with a single value for cases when the loudness considerations should preserve dynamic range but want to align the relevant/effective loudness of the sound to the system. If the audio asset 6 is a short sound, then the audio asset level 5 is a single, fixed or static value.

Figure 3:
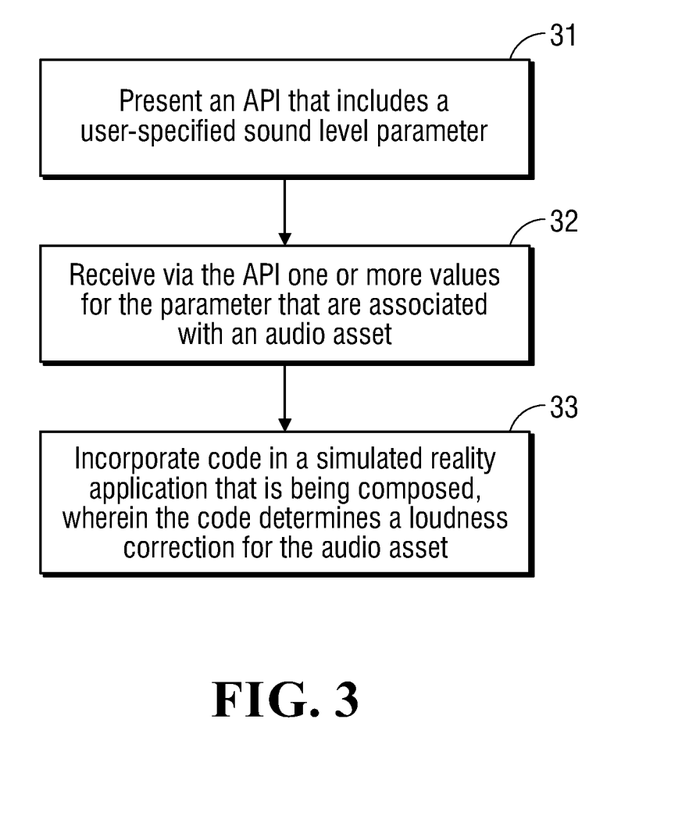
FIG. 3 is a flow diagram of a method for authoring a simulated reality application.

FIG. 3 is a flow diagram of a more generalized computer implemented method, for authoring a simulated reality application, that can use some of the specific aspects described above. In operation 31, the method (as performed by a computer) presents an API that includes a user-specified sound level parameter, and in operation 32 receives, via the API, one or more values for the parameter that are associated with the audio asset 6. In one example, the user-specified sound level parameter is the user desired sound level parameter 9 which is for the asset to be heard at a reference distance. In operation 33, the method incorporates code into a simulated reality application that is being composed, wherein the code determines the loudness correction function (loudness correction 3) for the audio asset based on the one or more values of the user-specified sound level parameter. The loudness correction gain is to then be applied to the audio asset 6 during run time of the simulated reality application. Variations to this generalized method can be as described above, which include one or more of the following:

the code may determine the loudness correction gain by determining a difference between i) the one or more values for the user-specified sound level parameter and ii) a playback hardware device parameter that represents a known or predefined sound level that can be produced by a playback hardware device on which the simulated reality application is running, wherein the loudness correction gain compensates for the difference;

the API configures a relative distance gain for the digital audio asset, and the code incorporated into the simulated reality application implements the relative distance gain which is to then be applied to the audio asset during the run time of the simulated reality application;

the API has one or more other input parameters or gains that specify a loudness range in which, or a minimum acceptable loudness at which, sound of the audio asset should be experienced; and the API has one or more other input parameters or gains that indicate how the digital audio asset has already been normalized or processed, by management of the author or by another digital audio processing software tool.

The formula or process of the total calibration gain 2, including a contribution from the loudness correction 3 and optionally one or more additional gains depicted in FIG. 1, may be incorporated into the software code of the simulated reality application, and as such may result in a total calibration gain value that can be rapidly computed and applied during run time or in real time, to each instance of playback of the audio asset 6 within the simulated reality application. In this manner, the author may for example conveniently set their desired SPL for a given audio asset, through the application development software API, and can then expect that during run time or playback of the simulated reality application the sound of the audio asset will have been "calibrated" or is at the desired sound level. Further adjustments to this sound will be made if the virtual object to which the audio asset is assigned moves beyond the virtual reference distance, by a relative distance gain 11 that may also be applied in real time. The relative distance gain 11 is discussed below in connection with FIG. 2.

Relative Distance Gain

In one aspect of the disclosure here, the API of the application development software has a relative distance gain 11 (see FIG. 1) which is a function that determines another gain value in addition to the total calibration gain 2, which further adjusts the audio asset (when applied by the audio rendering engine during run time of the simulated reality app.) The relative distance gain 11 is determined on a per audio asset basis and it may be independent of the gains that contribute to the total calibration gain 2. The relative distance gain controls how loud its audio asset will sound depending on the distance between the virtual object (to which the audio asset is assigned) and the virtual listening position. The function returns or outputs a gain, in response to an input distance. The relative distance gain is thus a variable that is applied (by the audio rendering engine) to the audio signal of the audio asset, for example during each instance of playback of the audio asset during execution of the simulated reality app. The code that implements the relative distance gain 11 may be incorporated (by the application development software or SDK) into compiled program code of the simulated reality application that is being authored.

The relative distance gain 11 may be determined according to the model having an example depicted in FIG. 2. As seen in the figure, the gain output is on the y-axis and is the is a function of input distance along the x-axis, being the distance between a sound source (located at a virtual object's position) and a listening position. The listening position may be the position of another virtual object for example one that represents the head or ears of a listener. When the virtual object, to which the sound source or audio asset is associated, moves relative to the listening position, or vice versa (the listening position moves relative to the virtual object), the relative distance gain that has been associated with the sound source will change accordingly, in order to obtain a realistic and desired listening impact (desired by the author of the app.)

The relative distance gain 11 may be given in linear domain or in decibels (dB) and is a generally monotonically decreasing function of increasing distance from the sound source. A user or author who composes a simulated reality application can configure the function, via the API of the application development software, by specifying one or more configuration parameters that define the behavior of one or more portions of the function.

Referring back to FIG. 2, a proximity portion of the function (model) is defined that covers a distance region that is "close" to the sound source, between zero and a Proximity Distance. In this portion, the gain may be clamped, e.g., to a constant, maximum value as shown, as the distance drops to and below the Proximity Distance. Both the maximum value (clamped value) and the Proximity Distance could be API configuration parameters that can be set by the user during authoring of the simulated reality app.

The proximity portion is followed by a middle portion that outputs a gain that rolls off with distance, for example linearly or according to a user defined envelope or roll off function, and includes the virtual Reference Distance, where the gain is defined to be 0 dB (or a linear value of one.) For distances beyond the Reference Distance, the gain is negative dB (or a linear value of less than one.) Again, the roll off behavior and in some cases the Reference Distance could be API configuration parameters that can be set by the user during authoring.

While certain aspects have been described and shown in the accompanying drawings, it is to be understood that such are merely illustrative of and not restrictive on the broad invention, and that the invention is not limited to the specific constructions and arrangements shown and described, since various other modifications may occur to those of ordinary skill in the art. For instance, the details of the distance model shown in FIG. 2, e.g., the normalization scheme or the reference distance indicated at 0 dB, may be different, as they could take on arbitrary values that define an expected relationship. The description is thus to be regarded as illustrative instead of limiting.

What is claimed is:

1. A non-transitory computer readable medium comprising instructions stored therein that configure a computer to:
   present an application programming interface, API, wherein the API comprises a user-specified sound level parameter;
   receive, via the API, one or more values for the user-specified sound level parameter that are associated with a digital audio asset; and
   incorporate code into a simulated reality application that is being composed, wherein the code determines a loudness correction gain or contribution for the digital audio asset based on the one or more values of the user-specified sound level parameter by determining a difference between i) the one or more values of the user-specified sound level parameter and ii) a playback hardware device parameter that represents a known or predefined sound level producible by a playback hardware device in which the simulated reality application is running, wherein the loudness correction gain compensates for the difference, and the loudness correction gain is to then be applied to the digital audio asset during run time of the simulated reality application.

2. The non-transitory computer readable medium of claim 1 wherein the
playback hardware device parameter includes one or more values that depend on a playback acoustic sensitivity of the playback hardware device.

3. The non-transitory computer readable medium of claim 1 wherein the known or predefined sound level is a sound level produced by the playback hardware device at a maximum or full scale audio signal value in the playback hardware device.

4. The non-transitory computer readable medium of claim 1 wherein the code that is incorporated into the simulated reality application obtains the playback hardware device parameter during the run time of the simulated reality application and not during compilation of the simulated reality application.

5. The non-transitory computer readable medium of claim 4 wherein the code obtains the playback hardware device parameter by querying an operating system of the playback hardware device.

6. The non-transitory computer readable medium of claim 1 wherein the user-specified sound level parameter is to be specified by an author of the simulated reality application.

7. The non-transitory computer readable medium of claim 1 wherein the instructions configure the computer to insert further code into the simulated reality application that is being composed, wherein the further code determines a total calibration gain that is to be applied to the digital audio asset during the run time of the simulated reality application, the loudness correction gain contributes to the total calibration gain as does one or more other gains.

8. The non-transitory computer readable medium of claim 7 wherein the further code determines a downstream gain from a playback hardware device, on which the simulated reality application is running, and the further code adjusts the total calibration gain for the digital audio asset based on the downstream gain being decreased.

9. The non-transitory computer readable medium of claim 7 wherein the further code determines that a real distance or real physical relationship between a speaker driver of a playback hardware device and a listener's ear is different than a known or predefined distance or relationship, and based on that determination adjusts the total calibration gain for the digital audio asset.

10. The non-transitory computer readable medium of claim 9 wherein the further code obtains updates to the real distance or real physical relationship during the run time.

11. The non-transitory computer readable medium of claim 1
wherein the known or predefined sound level produced by the playback hardware device and that is represented by the playback hardware device parameter, is a sound level that is produced when a speaker driver of the playback hardware device is at a known or predefined distance or relationship with respect to a listener's ear.

12. The non-transitory computer readable medium of claim 1 wherein the API configures a relative distance gain for the digital audio asset, and the instructions configure the computer to incorporate the relative distance gain into the simulated reality application, the relative distance gain to then be applied to the audio asset during the run time of the simulated reality application.

13. A computer implemented method for authoring a simulated reality application, the method comprising:
presenting an application programming interface, API, wherein the API comprises a user-specified sound level parameter;
receiving, via the API, one or more values for the user-specified sound level parameter that are associated with a digital audio asset; and
incorporating code into a simulated reality application that is being composed, wherein the code determines a loudness correction gain for the digital audio asset based on the one or more values of the user-specified sound level parameter by determining a difference between i) the one or more values for the user-specified sound level parameter and ii) a playback hardware device parameter that represents a known or predefined sound level producible by a playback hardware device on which the simulated reality application is running, wherein the loudness correction gain compensates for the difference, the loudness correction gain to then be applied to the digital audio asset during run time of the simulated reality application.

14. The method of claim 13 wherein
playback hardware device parameter includes one or more gain values that depend on the playback hardware device which comprises a headphone, an extra-aural speaker on a head worn device, or a loudspeaker in a room.

15. The method of claim 13 wherein the code that is incorporated into the simulated reality application obtains the playback hardware device parameter during the run time of the simulated reality application and not during compilation of the simulated reality application.

16. The method of claim 13 wherein the user-specified sound level parameter is a sound level that is specified by an author of the simulated reality application.

17. The method of claim 13 wherein the code determines a current manual volume setting in a playback hardware device on which the simulated reality application is running.

18. The method of claim 13 wherein the API configures a relative distance gain for the digital audio asset, the method further comprising
incorporating code into the simulated reality application that implements the relative distance gain which is to then be applied to the audio asset during the run time of the simulated reality application.

19. The method of claim 13 wherein the one or more values for the user-specified sound level parameter are in a tag or metadata associated with the digital audio asset.

20. The method of claim 19 wherein the tag or metadata comprises or points to a codec that includes the one or more values for the user-specified sound level parameter.

21. The method of claim 13 wherein the code, as incorporated into the simulated reality application, performs one, not both, of the following:
applies no asset normalization to the digital audio asset in response to an indication, received through the API or in a tag or metadata associated with the digital audio asset, that the digital audio asset i) has already been normalized or ii) is not to be re-normalized, and determines a total calibration gain based on an indicated or implied level of the digital audio asset; or
applies a dynamic normalization or a static normalization to the digital audio asset, and determines the total calibration gain based on a normalized level of the digital audio asset that is produced by the dynamic normalization or the static normalization.

22. The method of claim 13 wherein the API comprises one or more other parameters or gains that specify a loudness range in which, or a minimum acceptable loudness at which, sound of the digital audio asset is to be experienced.

23. The method of claim 13 wherein the API comprises one or more other parameters or gains that indicate how the digital audio asset has already been normalized or processed, by management of an author of the of the simulated reality application or by another digital audio processing software tool.

24. An electronic hardware device comprising:
a processor; and
memory having a simulated reality application that when executed by the processor determines a loudness correction gain or contribution for a digital audio asset based on one or more values of a user-specified sound level parameter, and applies the loudness correction gain to the digital audio asset during run time of the simulated reality application, wherein the processor determines the loudness correction gain by determining a difference between i) the one or more values for the user-specified sound level parameter and ii) a playback hardware device parameter that represents a known or predefined sound level producible by the electronic hardware device, wherein the loudness correction gain compensates for the difference.

25. The device of claim 24 wherein the processor is configured by the simulated reality application to obtain the playback hardware device parameter during the run time of the simulated reality application.

26. A computer system comprising:
a processor; and
a computer readable medium having instructions stored therein that configure the processor to:
present an application programming interface, API, wherein the API comprises a user-specified sound level parameter;
receive, via the API, one or more values for the user-specified sound level parameter that are associated with a digital audio asset; and
incorporate code into a simulated reality application that is being composed, wherein the code determines a loudness correction gain or contribution for the digital audio asset based on the one or more values of the user-specified sound level parameter, and the loudness correction gain is to then be applied to the digital audio asset during run time of the simulated reality application, wherein the processor determines the loudness correction gain by determining a difference between i) the one or more values for the user-specified sound level parameter and ii) a playback hardware device parameter that represents a known or predefined sound level producible by an electronic hardware device through which playback of a scene of the simulated reality application is experienced by an end user, wherein the loudness correction gain compensates for the difference.

* * * * *